(12) United States Patent
Liu et al.

(10) Patent No.: US 12,497,689 B2
(45) Date of Patent: Dec. 16, 2025

(54) SURFACE COATED CUTTING TOOLS

(71) Applicant: Kennametal Inc., Latrobe, PA (US)

(72) Inventors: Zhenyu Liu, Greensburg, PA (US);
Kimaya Prakash Vyavhare, Irwin, PA (US)

(73) Assignee: KENNAMETAL INC., Latrobe, PA (US)

(*) Notice: Subject to any disclaimer, the term of this patent is extended or adjusted under 35 U.S.C. 154(b) by 628 days.

(21) Appl. No.: 17/899,205

(22) Filed: Aug. 30, 2022

(65) Prior Publication Data

US 2023/0085248 A1    Mar. 16, 2023

Related U.S. Application Data

(60) Provisional application No. 63/238,551, filed on Aug. 30, 2021.

(51) Int. Cl.
| | | |
|---|---|---|
| C23C 16/40 | (2006.01) | |
| B23B 27/14 | (2006.01) | |
| C23C 16/02 | (2006.01) | |
| C23C 16/34 | (2006.01) | |
| C23C 16/36 | (2006.01) | |

(52) U.S. Cl.
CPC .......... C23C 16/403 (2013.01); B23B 27/148 (2013.01); C23C 16/0272 (2013.01); C23C 16/34 (2013.01); C23C 16/36 (2013.01); B23B 2228/10 (2013.01)

(58) Field of Classification Search
None
See application file for complete search history.

(56) References Cited

U.S. PATENT DOCUMENTS

| | | | |
|---|---|---|---|
| 993,878 | A | 5/1911 | Robichon |
| 7,273,665 | B2 | 9/2007 | Hayahi et al. |
| 7,276,301 | B2 | 10/2007 | Tsushima et al. |
| 7,442,433 | B2 | 10/2008 | Honma et al. |
| 7,597,970 | B2 | 10/2009 | Fukano et al. |
| 7,763,346 | B2 | 7/2010 | Osada et al. |
| 7,923,101 | B2 | 4/2011 | Ruppi |
| 7,972,714 | B2 | 7/2011 | Okada et al. |
| 7,985,471 | B2 | 7/2011 | Zackrisson et al. |
| 7,993,742 | B2 | 8/2011 | Ruppi |
| 8,012,611 | B2 | 9/2011 | Okada et al. |
| 8,053,063 | B2 | 11/2011 | Sandberg et al. |
| 8,053,064 | B2 | 11/2011 | Larsson et al. |
| 8,187,698 | B2 | 5/2012 | Sundstrom et al. |
| 8,211,555 | B2 | 7/2012 | Sundstrom et al. |
| 8,801,817 | B2 | 8/2014 | Paseuth et al. |
| 8,828,527 | B2 | 9/2014 | Tomita et al. |
| 8,945,250 | B2 | 2/2015 | Engstrom |
| 9,044,811 | B2 | 6/2015 | Paseuth et al. |
| 9,149,871 | B2 | 10/2015 | Johansson et al. |
| 9,206,510 | B2 | 12/2015 | Stiens et al. |
| 9,238,267 | B2 | 1/2016 | Stiens et al. |
| 9,365,925 | B2 | 6/2016 | Leicht et al. |
| 9,463,513 | B2 | 10/2016 | Östlund et al. |
| 9,636,748 | B2 | 5/2017 | Tomita et al. |
| 9,724,762 | B2 | 8/2017 | Sobana et al. |
| 9,782,830 | B2 | 10/2017 | Okude et al. |
| 9,828,254 | B2 | 11/2017 | Imamura et al. |
| 9,834,845 | B2 | 12/2017 | Imamura et al. |
| 9,844,816 | B2 | 12/2017 | Detani et al. |
| 9,849,517 | B2 | 12/2017 | Detani et al. |
| 9,863,064 | B2 | 1/2018 | Kanaoka et al. |
| 9,878,373 | B2 | 1/2018 | Paseuth et al. |
| 9,878,374 | B2 | 1/2018 | Paseuth et al. |
| 9,879,350 | B2 | 1/2018 | Paseuth et al. |
| 9,945,029 | B2 | 4/2018 | Bjormander |
| 9,956,667 | B2 | 5/2018 | Bjormander |
| 9,987,687 | B2 | 6/2018 | Lindahl et al. |
| 9,993,878 | B2 | 6/2018 | Takahashi et al. |
| 10,058,924 | B2 | 8/2018 | Kanaoka et al. |
| 10,072,332 | B2 | 9/2018 | Satoh |
| 10,174,421 | B2 | 1/2019 | Kodama et al. |
| 10,286,453 | B2 | 5/2019 | Ruppi et al. |

(Continued)

FOREIGN PATENT DOCUMENTS

| | | |
|---|---|---|
| CN | 101468401 B | 9/2013 |
| EP | 1788124 B1 | 9/2008 |

(Continued)

OTHER PUBLICATIONS

Jun. 24, 2024 Foreign Office Action Chinese Application No. CN20228057034, 02 pages.
International Preliminary Report on Patentability for International Application No. PCT/US2022/042017, mailed Mar. 7, 2024, 8 Pages.
Kennametal: Steel Turning Grade with KENGold CVD Coating Technology, KCP25C, 05 Pages, Retrieved from [https://www.kennametal.com/us/en/products/metalworking-tools/turning/coating-technologies/kengold.html].
International Search Report and Written Opinion for International Application No. PCT/US2022/042017, mailed Dec. 21, 2022, 9 Pages.
Konstantiniuk, F., et al., "Mechanical Properties of Single and Polycrystalline alpha-Al2O3 Coatings Grown by Chemical Vapor Deposition," Surface Coatings Technology, Feb. 11, 2021, 410, 126959, pp. 1-7.

*Primary Examiner* — Seth Dumbris
(74) *Attorney, Agent, or Firm* — Christopher J. Owens

(57) ABSTRACT

In one aspect, cutting tools are described herein comprising wear resistant coatings employing one or more refractory layers of polycrystalline $\alpha$-$Al_2O_3$. Briefly, a coated cutting tool described herein comprises a substrate, and a coating adhered to the substrate, the coating comprising a layer of polycrystalline $\alpha$-$Al_2O_3$ deposited by chemical vapor deposition (CVD), wherein at least 5% of all grain boundaries in the polycrystalline $\alpha$-$Al_2O_3$ layer have a misorientation angle less than 15 degrees as determined using a field-emission scanning electron microscope (FESEM) and an electron backscatter diffraction (EBSD) detector.

19 Claims, No Drawings

(56) References Cited

U.S. PATENT DOCUMENTS

| | | | |
|---|---|---|---|
| 10,307,831 B2 | 6/2019 | Okude et al. |
| 10,369,632 B2 | 8/2019 | Watanabe et al. |
| 10,370,758 B2 | 8/2019 | Kodama et al. |
| 10,456,844 B2 | 10/2019 | Okude et al. |
| 10,570,509 B2 | 2/2020 | Bjormander et al. |
| 10,612,133 B2 | 4/2020 | Satoh |
| 10,612,134 B2 | 4/2020 | Satoh |
| 10,625,348 B2 | 4/2020 | Satoh |
| 10,639,724 B2 | 5/2020 | Nakamura |
| 10,654,181 B2 | 5/2020 | Yoshimura et al. |
| 10,695,841 B2 | 6/2020 | Kawahara |
| 10,711,345 B2 | 7/2020 | Cho et al. |
| 10,722,948 B2 | 7/2020 | Kawahara |
| 10,946,453 B2 | 3/2021 | Satoh et al. |
| 10,946,454 B2 | 3/2021 | Satoh et al. |
| 10,994,338 B2 | 5/2021 | Kanaoka et al. |
| 11,007,579 B2 | 5/2021 | Fukushima |
| 11,014,166 B2 | 5/2021 | Ishii |
| 11,020,803 B2 | 6/2021 | Satoh et al. |
| 11,203,069 B2 | 12/2021 | Morjan Brenning et al. |
| 11,213,893 B2 | 1/2022 | Engqvist et al. |
| 11,219,952 B2 | 1/2022 | Ono et al. |
| 12,163,248 B2 | 12/2024 | Liu |
| 2005/0129987 A1* | 6/2005 | Ruppi .................. C23C 28/044 428/408 |
| 2006/0019117 A1 | 1/2006 | Cedergren et al. |
| 2006/0029831 A1 | 2/2006 | Lindholm et al. |
| 2006/0257691 A1 | 11/2006 | Trinh et al. |
| 2008/0240876 A1 | 10/2008 | Elkouby et al. |
| 2013/0221351 A1 | 8/2013 | Ebata et al. |
| 2014/0287228 A1 | 9/2014 | Liu et al. |
| 2014/0291036 A1 | 10/2014 | Leicht et al. |
| 2016/0305018 A1 | 10/2016 | Cooper et al. |
| 2016/0332237 A1* | 11/2016 | Nakamura ............ B23B 27/148 |
| 2018/0057934 A1 | 3/2018 | Cooper et al. |
| 2018/0126465 A1 | 5/2018 | Satoh |
| 2018/0274091 A1 | 9/2018 | Chen et al. |
| 2018/0347027 A1 | 12/2018 | Kumar et al. |
| 2019/0003060 A1 | 1/2019 | Okude et al. |
| 2019/0242013 A1 | 8/2019 | Cooper et al. |
| 2019/0283143 A1 | 9/2019 | Satoh et al. |
| 2020/0002819 A1 | 1/2020 | Stiens et al. |
| 2020/0095675 A1 | 3/2020 | Lindahl et al. |
| 2020/0115794 A1 | 4/2020 | Lindahl et al. |
| 2020/0141007 A1 | 5/2020 | Lindahl et al. |
| 2020/0189006 A1 | 6/2020 | Satoh et al. |
| 2020/0282465 A1 | 9/2020 | Satoh |
| 2020/0298317 A1 | 9/2020 | Ono et al. |
| 2021/0123140 A1 | 4/2021 | Engqvist et al. |
| 2021/0187621 A1 | 6/2021 | Ishii |
| 2021/0207273 A1 | 7/2021 | Liu |

FOREIGN PATENT DOCUMENTS

| | | |
|---|---|---|
| EP | 2580370 B1 | 11/2015 |
| EP | 2902528 B1 | 6/2016 |
| EP | 3318657 A1 | 5/2018 |
| EP | 2570510 B2 | 2/2019 |
| EP | 3848485 A1 | 7/2021 |
| JP | 2018058200 A | 4/2018 |
| KR | 101824654 B1 | 2/2018 |
| KR | 101904856 B1 | 10/2018 |
| KR | 101951316 B1 | 6/2019 |
| WO | 2018061856 A1 | 4/2018 |
| WO | 2020174755 A1 | 9/2020 |

* cited by examiner

SURFACE COATED CUTTING TOOLS

RELATED APPLICATION DATA

The present application claims priority pursuant to 35 U.S.C. § 119(e) to U.S. Provisional Patent Application 63/238,551 filed Aug. 30, 2021, which is incorporated herein by reference in its entirety.

FIELD

The present invention relates to refractory coatings and, in particular, to refractory coatings deposited by chemical vapor deposition (CVD) for cutting tool and/or metal removal applications.

BACKGROUND

Cutting tools, including cemented carbide cutting tools, have been used in both coated and uncoated conditions for machining various metals and alloys. In order to increase cutting tool wear resistance, performance and lifetime, one or more layers of refractory material have been applied to cutting tool surfaces. TiC, TiCN, TiN and/or $Al_2O_3$, for example, have been applied to cemented carbide substrates by CVD and by physical vapor deposition (PVD). While effective in inhibiting wear and extending tool lifetime in a variety of applications, refractory coatings based on single or multi-layer constructions of the foregoing refractory materials have increasingly reached their performance limits, thereby calling for the development of new coating architectures for cutting tools.

SUMMARY

In one aspect, cutting tools are described herein comprising wear resistant coatings employing one or more refractory layers of polycrystalline $\alpha$-$Al_2O_3$. Briefly, a coated cutting tool described herein comprises a substrate, and a coating adhered to the substrate, the coating comprising a layer of polycrystalline $\alpha$-$Al_2O_3$ deposited by chemical vapor deposition (CVD), wherein at least 5% of all grain boundaries in the polycrystalline $\alpha$-$Al_2O_3$ layer have a misorientation angle less than 15 degrees as determined using a field-emission scanning electron microscope (FE-SEM) and an electron backscatter diffraction (EBSD) detector.

In some embodiments, the misorientation angle is less than 10 degrees or less than 5 degrees.

In some embodiments, 5% to 15% of all grain boundaries in the polycrystalline $\alpha$-$Al_2O_3$ layer have a misorientation of 2-5 degrees and at least 5% or at least 6% of all grain boundaries in the polycrystalline $\alpha$-$Al_2O_3$ layer have a misorientation of greater than 5 degrees up to 15 degrees. In some embodiments, for example, 7-10% of all grain boundaries of polycrystalline $\alpha$-$Al_2O_3$ layer have a misorientation of 2-5 degrees and 6.5-10% of all grain boundaries of polycrystalline $\alpha$-$Al_2O_3$ layer have a misorientation of greater than 5 degrees up to 15 degrees. Additionally, a ratio of grain boundaries in the polycrystalline $\alpha$-$Al_2O_3$ layer having misorientation of 2-5 degrees to grain boundaries having misorientation of greater than 5 degrees up to 15 degrees has a value of 0.7 to 1.8.

Moreover, in addition to the low angle grain boundaries characterized above, the layer of polycrystalline $\alpha$-$Al_2O_3$, in some embodiments, may also exhibit a texture coefficient (TC) greater than 6 for the (006) growth direction, the texture coefficient being defined as:

$$TC(hkl) = \frac{I(hkl)}{I_o(hkl)} \left\{ \frac{1}{n} \sum \frac{I(hkl)}{I_o(hkl)} \right\}^{-1}$$

where
I(hkl)=measured intensity of the (hkl) reflection
$I_o$(hkl)=standard intensity of the (hkl) reflection according to International Center for Diffraction Data (ICDD) card 43-1484
n=number of reflections used in the TC calculation
(hkl) reflections used in the TC calculation are (012), (104), (110), (006), (113), (202), (024) and (116).

In additional embodiments, the layer of polycrystalline $\alpha$-$Al_2O_3$ can exhibit a texture coefficient (TC) greater than 5 for the (0 0 12) growth direction, the texture coefficient being defined as:

$$TC(hkl) = \frac{I(hkl)}{I_o(hkl)} \left\{ \frac{1}{n} \sum \frac{I(hkl)}{I_o(hkl)} \right\}^{-1}$$

where
I(hkl)=measured intensity of the (hkl) reflection
$I_o$(hkl)=standard intensity of the (hkl) reflection according to International Center for
Diffraction Data (ICDD) card 42-1468
n=number of reflections used in the TC calculation (hkl) reflections used in the TC calculation are (012), (104), (110), (113), (116), (300) and (0 0 12).

These and other embodiments are described further in the detailed description which follows.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In one aspect, cutting tools are described herein comprising refractory coatings employing one or more polycrystalline $\alpha$-$Al_2O_3$ layers having grain boundary architectures advantageous for resisting various degradative mechanisms including cracking and/or flaking. Accordingly, cutting tools having such refractory coatings, in some embodiments, are suitable for high wear and/or abrasion applications, such as metal cutting operations. Turning now to specific components, a coated article comprises a substrate. A coated article can comprise any substrate not inconsistent with the objectives of the present invention. For example, a substrate can be a cutting tool or tooling used in wear applications. Cutting tools include, but are not limited to, cutting inserts (indexable and non-indexable), end mills or drills. Indexable cutting inserts can have any desired ANSI standard geometry for milling or turning applications. Substrates of coated articles described herein can be formed of cemented carbide, carbide, ceramic, cermet, steel or other alloy. A cemented carbide substrate, in some embodiments, comprises tungsten carbide (WC). WC can be present in a cutting tool substrate in an amount of at least about 80 weight percent or in an amount of at least about 85 weight percent. Additionally, metallic binder of cemented carbide can comprise cobalt or cobalt alloy. Cobalt, for example, can be present in a cemented carbide substrate in an amount ranging from 1 weight percent to 15 weight percent. In some embodiments, cobalt is present in a cemented carbide substrate in an amount ranging from 5-12 weight percent or from 6-10 weight percent. Further, a cemented carbide substrate may exhibit a zone of binder enrichment beginning at and extending inwardly from the surface of the substrate.

Cemented carbide substrates can also comprise one or more additives such as, for example, one or more of the following elements and/or their compounds: titanium, niobium, vanadium, tantalum, chromium, zirconium and/or hafnium. In some embodiments, titanium, niobium, vanadium, tantalum, chromium, zirconium and/or hafnium form solid solution carbides with WC of the substrate. In such embodiments, the substrate can comprise one or more solid solution carbides in an amount ranging from 0.1-5 weight percent. Additionally, a cemented carbide substrate can comprise nitrogen.

As described above, the coating adhered to the substrate comprises a layer of polycrystalline $\alpha$-$Al_2O_3$ deposited by CVD, wherein at least 5% of all grain boundaries in the polycrystalline $\alpha$-$Al_2O_3$ layer have a misorientation angle less than 15 degrees as determined using a field-emission scanning electron microscope (FESEM) and an electron backscatter diffraction (EBSD) detector. Such low angle grain boundaries can enhance strength and performance of the alumina layer for cutting applications. In some embodiments, at least 10% of all grain boundaries in the polycrystalline $\alpha$-$Al_2O_3$ layer have a misorientation angle less than 15 degrees. For example, 10-50% of all grain boundaries in the polycrystalline $\alpha$-$Al_2O_3$ layer have a misorientation angle less than 15 degrees. Additionally, in some embodiments, the foregoing percentages of grain boundaries in the polycrystalline $\alpha$-$Al_2O_3$ layer can exhibit a misorientation angle of less than 10 degrees, such as 2-5 degrees. It is contemplated herein that deposition conditions of the polycrystalline $\alpha$-$Al_2O_3$ layer can be chosen to adjust grain boundary misorientation angles and/or the percentages of grain boundaries exhibiting the misorientation angles. In some embodiments, for example, greater than 50% of all grain boundaries in the in the polycrystalline $\alpha$-$Al_2O_3$ layer exhibit a misorientation angle less than 15 degrees or less than 10 degrees.

In some embodiments, 5% to 15% of all grain boundaries in the polycrystalline $\alpha$-$Al_2O_3$ layer have a misorientation of 2-5 degrees and at least 5% or at least 6% of all grain boundaries in the polycrystalline $\alpha$-$Al_2O_3$ layer have a misorientation of greater than 5 degrees up to 15 degrees. In some embodiments, for example, 7-10% of all grain boundaries of polycrystalline $\alpha$-$Al_2O_3$ layer have a misorientation of 2-5 degrees and 6.5-10% of all grain boundaries of polycrystalline $\alpha$-$Al_2O_3$ layer have a misorientation of greater than 5 degrees up to 15 degrees. Additionally, a ratio of grain boundaries in the polycrystalline $\alpha$-$Al_2O_3$ layer having misorientation of 2-5 degrees to grain boundaries having misorientation of greater than 5 degrees up to 15 degrees has a value of 0.7 to 1.8. Table I provides additional values for the ratio of grain boundaries in the polycrystalline $\alpha$-$Al_2O_3$ layer having misorientation of 2-5 degrees to grain boundaries having misorientation of greater than 5 degrees up to 15 degrees.

TABLE I

| Misorientation Ratio |
| --- |
| 0.8-1.8 |
| 0.9-1.8 |
| 1-1.7 |
| 1.3-1.6 |
| 1.3-1.8 |
| 1.4-1.8 |
| 1.4-1.7 |

The foregoing misorientation ratio indicates a broader spread of aligned alumina grains, which can enhance cutting performance and coating lifetimes. Prior $\alpha$-$Al_2O_3$ layers may exhibit 10-15% of all grain boundaries having a misorientation less than 5 degrees. However, beyond 5 degrees, the alumina grains are highly disordered. Such a precipitous fall between ordered and disordered grains compromises integrity of the $\alpha$-$Al_2O_3$ layer, thereby rendering the layer prone to one or more degradative mechanisms during cutting and/or other wear operations.

Grain boundaries of polycrystalline $\alpha$-$Al_2O_3$ layer, in some embodiments, are tilt boundaries or twist boundaries. In some embodiments, the grain boundaries are a mixture of tilt and twist boundaries. When a mixture is present, the majority of the grain boundaries are tilt boundaries, in some embodiments.

Grain boundaries are characterized by 5 rotational and 3 translational parameters. All these parameters influence the properties of boundaries. The 3 translational parameters describe atomic shifts that may occur at grain boundaries. The rotational parameters are the 3 parameters describing the misorientation between the crystals and 2 parameters describing the grain boundary normal. The misorientation itself is a rotation consisting of a rotation axis (2 parameters) and a rotation angle (1 parameter). Usually, when the rotation angle is small)(~<15°) the grain boundary is composed of individual dislocations and the boundary is called is small/low angle grain boundary. When the angle is larger, the boundary structure is less well defined and it called a large angle grain boundary.

Grain boundaries and their characteristic rotational parameters can be observed, for example, by 2D and 3D EBSD or by TEM. The atomic parameters can be observed only by atomic resolution TEM.

In crystalline materials, the orientation of a crystallite is defined by a transformation from a sample reference frame (i.e. defined by the direction of a rolling or extrusion process and two orthogonal directions) to the local reference frame of the crystalline lattice, as defined by the basis of the unit cell. In the same way, misorientation is the transformation necessary to move from one local crystal frame to some other crystal frame. That is, it is the distance in orientation space between two distinct orientations. If the orientations are specified in terms of matrices of direction cosines gA and gB, then the misorientation operator $\Delta gAB$ going from A to B can be defined as follows:

$$g_B = \Delta g_{AB} g_A$$

$$\Delta g_{AB} = g_B g_A^{-1}$$

where the term $g^{-1}$ A is the reverse operation of gA, that is, transformation from crystal frame A back to the sample frame. This provides an alternate description of misorientation as the successive operation of transforming from the first crystal frame (A) back to the sample frame and subsequently to the new crystal frame (B).

Various methods can be used to represent this transformation operation, such as: Euler angles, Rodrigues vectors, axis/angle (where the axis is specified as a crystallographic direction), or unit quaternions. EBSD is well suited to extract this type of information as it gives both statistical and spatial information about the grain boundaries. The pattern consists of straight bright bands, so called Kikuchi bands, which have a direct relation to the lattice planes of the diffracting crystal: the centre line of each of the bands directly corresponds to the gnomonic projection of the lattice planes. The width of the Kikuchi band is approximately proportional to the Bragg angle of electron diffraction on the related lattice plane. The band intensity profile corresponds to the dynamic electron diffraction intensity obtained in a rocking experiment across the related lattice plane.

From the geometry of the Kikuchi bands in the pattern, the crystallographic phase and orientation can be determined. The band profiles contain information on the local defect densities (in particular on dislocation densities). This information can be obtained in a highly automated manner by computer software which then displays the basis of so called EBSD-based orientation microscopy (ORM).

Grain boundary misorientation in the polycrystalline α-Al$_2$O$_3$ can be determined according to the following protocol. A cross-sectional area of the coated tool is polished to a mirror finish. Colloidal silica is a suitable polishing agent, although diamond paste, ion milling, and other methods are acceptable. The prepared surface is observed using a field-emission scanning electron microscope (FESEM) and an electron backscatter diffraction (EBSD) detector. With the FESEM, an electron beam at an acceleration voltage of 25 kV irradiated the polished surface, which was inclined to 70° with respect to the incident electron beam, to measure orientation angles of the hexagonal alumina crystal grains based on the collected Kikuchi diffraction patterns. Data is collected from an area of approximately 20 μm×80 μm, with a step size of 0.1 μm. Data processing is done using a commercially available software for the FESEM/EBSD apparatus to determine a misorientation angle. Misorientation angles of <2° were discarded as possible strain within an individual grain, while grain boundaries were identified by misorientation angles >2°. An average over 3 EBSD maps is taken to arrive at the misorientation values.

In addition to the low angle grain boundaries characterized above, the layer of polycrystalline α-Al$_2$O$_3$, in some embodiments, may also exhibit a texture coefficient (TC) greater than 6 for the (006) growth direction, the texture coefficient being defined as:

$$TC(hkl) = \frac{I(hkl)}{I_o(hkl)} \left\{ \frac{1}{n} \sum \frac{I(hkl)}{I_o(hkl)} \right\}^{-1}$$

where
I(hkl)=measured intensity of the (hkl) reflection
I$_0$(hkl)=standard intensity of the (hkl) reflection according to International Center for Diffraction Data (ICDD) card 43-1484
n=number of reflections used in the TC calculation
(hkl) reflections used in the TC calculation are (012), (104), (110), (006), (113), (202), (024) and (116). In some embodiments, TC (006) of the polycrystalline α-Al$_2$O$_3$ layer is greater than 7, such as 7 to 7.8 or 7.3 to 7.7.

In additional embodiments, the layer of polycrystalline α-Al$_2$O$_3$ can exhibit a texture coefficient (TC) greater than 5 for the (0 0 12) growth direction, the texture coefficient being defined as:

$$TC(hkl) = \frac{I(hkl)}{I_o(hkl)} \left\{ \frac{1}{n} \sum \frac{I(hkl)}{I_o(hkl)} \right\}^{-1}$$

where
I(hkl)=measured intensity of the (hkl) reflection
I$_0$(hkl)=standard intensity of the (hkl) reflection according to International Center for Diffraction Data (ICDD) card 42-1468
n=number of reflections used in the TC calculation
(hkl) reflections used in the TC calculation are (012), (104), (110), (113), (116), (300) and (0 0 12). In some embodiments, TC (0 0 12) of the polycrystalline α-Al$_2$O$_3$ is greater than 6, such as 6.5 to 7.5. In some embodiments, a ratio of TC(006) to TC(0 0 12) for the polycrystalline α-Al$_2$O$_3$ layer is greater than 1 up to 1.2.

The XRD peak data for calculation of the TC(006) and TC (0 0 12) is measured on a Bragg focusing diffractometer. Incidence Optics Included:
Long fine focus X-ray tube operating at 45 KV and 40 MA.
Variable divergence optic operating in automatic mode to insure constant irradiated sample volume throughout the analysis.
Fixed antiscatter slit Receiving Optics included:
Variable Antiscatter slit operating in automatic mode to match the automatic divergence slit Multistrip solid state detector operating in scanning mode.

Scan parameters (speed and count time) are selected to insure a minimum of ten data steps across the peak full width at half max (FWHM) and approximately 10,000 total counts on the most intense peak. Collected data is first converted from variable mode to fixed mode usable for analysis. This conversion is completed using the formula:

$$I_{FIX}(\theta, a) = I_{ADS}(\theta, L) \times \left( \frac{R \sin(a/2)}{L} \right) \times \left( \frac{1}{\sin(\theta + a/2)} + \frac{1}{\sin(\theta - a/2)} \right)$$

where a=the divergence angle and L=the irradiated length on the sample

The corrected intensity is analyzed using peak finding software to identify the peak position of all peaks in the collected data. The peaks are then refined using a profile function to precisely identify the peak position and peak height. This peak data is used for the alumina texture coefficient analysis. Due to the complexity of the CVD coating architecture, a thickness correction for the peak intensity was not applied.

Grains of the polycrystalline α-Al$_2$O$_3$ layer, in some embodiments, can exhibit a columnar morphology with the long axis normal or substantially normal to the substrate. Further, the alumina phase can exhibit low residual tensile stress in the as-deposited state. In some embodiments, the alumina phase has a residual tensile stress of 100-500 MPa or 20-400 MPa in the as-deposited state. Residual stress of the alumina phase can be determined using the Chi tilt Sin$^2$ψ method with reference to the (116) reflection. For the alumina phase analysis, Poisson's Ratio (ν) was set to 0.19, and the elastic modulus (E in GPa) was determined to be 415 from analysis of a single phase α-alumina coating by nanoindentation hardness. Additionally, the polycrystalline α-$Al_2O_3$ layer can have any desired thickness. In some embodiments, the polycrystalline α-$Al_2O_3$ layer has a thickness of 1-20 μm or 5-15 μm.

The polycrystalline α-$Al_2O_3$ layer can be deposited directly on the substrate surface. Alternatively, a coating described herein can further comprise one or more inner layers between the polycrystalline α-$Al_2O_3$ layer and the substrate. Inner layer(s), in some embodiments, comprise one or more metallic elements selected from the group consisting of aluminum and metallic elements of Groups IVB, VB and VIB of the Periodic Table and one or more non-metallic elements selected from Groups IIIA, IVA, VA and VIA of the Periodic Table. In some embodiments, one or more inner layers between the substrate and multiphase refractory layer comprise a carbide, nitride, carbonitride, oxycarbonitride, oxide or boride of one or more metallic elements selected from the group consisting of aluminum and metallic elements of Groups IVB, VB and VIB of the Periodic Table.

For example, one or more inner layers are selected from the group consisting of titanium nitride, titanium carbonitride, titanium oxycarbonitride, titanium carbide, zirconium nitride, zirconium carbonitride, hafnium nitride, hafnium carbonitride, $TiAl_xSi_yC_vN$, and aluminum oxynitride. Further, a layer of titanium oxycarbonitride can be employed as a bonding layer for the refractory layer and inner layers of the coating. Inner layer(s) of the coating can have any thickness not inconsistent with the objectives of the present invention. In some embodiments, a single inner layer can have a thickness of at least 1.5 μm. Alternatively, a plurality of inner layers can collectively achieve thickness of at least 1.5 μm.

The polycrystalline α-$Al_2O_3$ layer can be the outermost layer of the coating. Alternatively, a coating described herein can comprise one or more outer layers over the polycrystalline α-$Al_2O_3$ layer. Outer layer(s) can comprise one or more metallic elements selected from the group consisting of aluminum and metallic elements of Groups IVB, VB and VIB of the Periodic Table and one or more non-metallic elements selected from Groups IIIA, IVA, VA and VIA of the Periodic Table. Outer layer(s) over the polycrystalline α-$Al_2O_3$ layer can comprise a carbide, nitride, carbonitride, oxycarbonitride, oxide or boride of one or more metallic elements selected from the group consisting of aluminum and metallic elements of Groups IVB, VB and VIB of the Periodic Table. For example, one or more outer layers are selected from the group consisting of titanium nitride, titanium carbonitride, titanium oxycarbonitride, titanium carbide, zirconium nitride, zirconium carbonitride, hafnium nitride, hafnium carbonitride, alumina, $TiAl_xSi_yC_vN$, aluminum oxynitride, and combinations thereof.

Outer layers of coatings described herein can have any thickness not inconsistent with the objectives of the present invention. A coating outer layer, in some embodiments, can have a thickness ranging from 0.2 μm to 5 μm.

Coatings described herein can be subjected to post-coat treatments. Coatings, for example, can be blasted with various wet and/or dry particle compositions. Post coat blasting can be administered in any desired manner. In some embodiments, post coat blasting comprises shot blasting or pressure blasting. Pressure blasting can be administered in a variety of forms including compressed air blasting, wet compressed air blasting, pressurized liquid blasting, wet blasting and steam blasting. Wet blasting, for example, is accomplished using a slurry of inorganic and/or ceramic particles, such as alumina, and water. The particle slurry can be pneumatically projected at a surface of the coated cutting tool body to impinge on the surface of the coating. The inorganic and/or ceramic particles can generally range in size between about 20 μm and about 100 μm.

Blasting parameters include pressure, angle of impingement, distance to the part surface and duration. In some embodiments, angle of impingement can range from about 10 degrees to about 90 degrees, i.e., the particles impinge the coating surface at an angle ranging from about 10 degrees to about 90 degrees. Suitable pressures can range from 30-55 pounds per square inch (psi) at a distance to the coated surface of 1-6 inches. Further, duration of the blasting can generally range from 1-10 seconds or longer. Blasting can be generally administered over the surface area of the coating or can be applied to select locations such as in a workpiece contact area of the cutting tool. A workpiece contact area can be a honed region of the cutting tool.

In other embodiments, a coating is subjected to a polishing post-coat treatment. Polishing can be administered with paste of appropriate diamond or ceramic grit size. Grit size of the paste, in some embodiments, ranges from 1 μm to 10 μm. In one embodiment, a 5-10 μm diamond grit paste is used to polish the coating. Further, grit paste can be applied to the CVD coating by any apparatus not inconsistent with the objectives of the present invention, such as brushes. In one embodiment, for example, a flat brush is used to apply grit paste to the CVD coating in a workpiece contact area of the cutting tool.

A coating described herein can be blasted or polished for a time period sufficient to achieve a desired surface roughness ($R_a$) and/or other parameters such as reducing residual tensile stress in the coating. In some embodiments, a coating subjected to post-coat treatment has a surface roughness ($R_a$) selected from Table I.

TABLE I

| Post-Coat Surface Roughness ($R_a$) |
| --- |
| Coating Surface Roughness ($R_a$) - nm |
| ≤500 |
| ≤250 |
| <200 |
| 10-250 |
| 50-175 |
| 25-150 |

Coating surface roughness can be determined by optical profilometry using WYKO® NT-Series Optical Profilers commercially available from Veeco Instruments, Inc. of Plainview, New York. Coating surface roughness can be determined via optical metrology with instrumentation commercially available from Bruker Alicona of Itasca, IL.

Further, a post-coat treatment, in some embodiments, does not remove one or more outer layers of the coating. In some embodiments, for example, a post-coat treatment does not remove an outer layer of TiN, TiCN and/or TiOCN. Alternatively, a post-coat treatment can remove or partially remove one or more outer layers, such as TiN, TiCN and TiOCN to expose the underlying polycrystalline α-$Al_2O_3$ layer.

These and other embodiments are further illustrated in the following non-limiting examples.

Example 1—Coated Cutting Tools

Sintered cemented carbide cutting inserts of ANSI geometry CNMG433RP were provided having the composition of Table II.

TABLE II

Sintered Cemented Carbide Substrate Composition

| Component | Weight Percent |
| --- | --- |
| Cobalt | 6.5-7.5 |
| Group IV-VI Carbides | 5-7 |
| WC | Balance |

The sintered cemented carbide cutting inserts were provided a CVD coating having the composition and architecture provided in Table III.

TABLE III

CVD Coating Architecture

| Layer | Thickness (μm) |
| --- | --- |
| TiN* | 0.2-0.75 |
| MT-TiCN | 6-10 |
| TiO$_x$C$_y$N$_z$ | 0.5-1 |
| α-Al$_2$O$_3$ | 6-10 |
| TiCN/TiN† | 0.5-1.5 |

*Base layer adjacent to the substrate
†This layer removed from the rake face via blasting The coating was deposited in a Sucotec CVD furnace commercially available from Oerlikon Balzers. The coating was deposited according to the parameters of Tables IV and V. For enhanced adhesion, a bonding layer including HT-TiCN and TiOCN is adjacent to the Al$_2$O$_3$ layer.

TABLE IV

CVD Deposition of Coating Layers

| Process Step | H$_2$ vol. % | N$_2$ vol. % | TiCl$_4$ vol. % | CH$_3$CN vol. % | CH$_4$ vol. % | AlCl$_3$ vol. % | CO$_2$ vol. % | CO vol. % | HCl vol. % | H$_2$S vol. % |
| --- | --- | --- | --- | --- | --- | --- | --- | --- | --- | --- |
| TiN | Bal. | 36-38 | 0.007-0.010 | — | — | — | — | — | — | — |
| MT-TiCN | Bal. | 16-18 | 0.10-0.15 | 0.001-0.002 | — | — | — | — | — | — |
| HT-TiCN | Bal. | 28-30 | 0.008-0.011 | — | 4.3-4.5 | — | — | — | — | — |
| TiOCN | Bal. | 34-37 | 0.009-0.012 | — | 1.8-2.3 | — | — | 1.3-1.4 | 1.6-1.7 | — |
| TiAlOCN | Bal. | 35-38 | 0.012-0.015 | 0.001-0.003 | — | 0.55-0.65 | — | 4.3-4.5 | — | — |
| Al$_2$O$_3$ | Bal. | — | — | — | — | 2.0-2.3 | 4.25-4.35 | 2.3-2.5 | 1.9-2.0 | 0.6-0.7 |
| Outer TiCN | Bal. | 28-30 | 0.008-0.011 | — | 4.3-4.5 | — | — | — | — | — |
| Outer TiN | Bal. | 40-43 | 0.011-0.015 | — | — | — | — | — | — | — |

TABLE V

CVD Deposition Steps

| Process Step | Temperature ° C. | Pressure mbar | Time min. |
| --- | --- | --- | --- |
| TiN | 850-960 | 60-90 | 10-90 |
| MT-TiCN | 900-940 | 70-100 | 50-400 |
| HT-TiCN | 900-1050 | 60-150 | 30-200 |
| TiOCN | 950-1050 | 200-500 | 30-70 |
| Al$_2$O$_3$ | 950-1050 | 50-120 | 10-750 |

The rake faces of the coated inserts were blasted with slurry as described hereinabove to remove the outer TiCN/TiN layer and expose the underlying α-Al$_2$O$_3$ layer. Nine of the blasted inserts were chosen for texture evaluation and characterization of grain misorientation of the α-Al$_2$O$_3$ layer. The results of the characterization are provided in Table VI and Table VII.

TABLE VI

TC (006) and (0 0 12) of Coated Cutting Inserts

| Cutting Insert | TC (006) | TC (0 0 12) |
| --- | --- | --- |
| 1 | 7.38 | 6.65 |
| 2 | 7.44 | 6.67 |
| 3 | 7.51 | 6.80 |
| 4 | 7.30 | 6.61 |
| 5 | 7.50 | 6.76 |
| 6 | 7.57 | 6.76 |
| 7 | 7.75 | 6.73 |
| 8 | 7.24 | 6.67 |
| 9 | 7.06 | 6.58 |

TABLE VII

Grain Misorientation in α-Al$_2$O$_3$ layer

| Cutting Insert | Misorientation 2-5 Degrees | | | Misorientation 5-15 Degrees | | |
| --- | --- | --- | --- | --- | --- | --- |
| | Map 1 | Map 2 | Map 3 | Map 1 | Map 2 | Map 3 |
| 1 | 8.55 | 8.06 | 7.62 | 5.47 | 5.88 | 6.55 |
| 2 | 13.3 | 13.1 | 14.15 | 8.45 | 5.65 | 8.09 |
| 3 | 11.7 | 9.08 | 8.79 | 9.18 | 7.83 | 6.83 |
| 4 | 9.49 | 9.38 | 9.22 | 6.10 | 5.22 | 6.82 |
| 5 | 9.87 | 9.09 | 11.43 | 7.40 | 6.93 | 6.51 |
| 6 | 11.65 | 10.36 | 10.90 | 8.85 | 6.23 | 8.48 |
| 7 | 9.15 | 9.09 | 7.97 | 6.94 | 5.77 | 7.76 |
| 8 | 9.87 | 7.59 | 10.05 | 5.99 | 5.21 | 5.12 |
| 9 | 6.08 | 5.47 | 6.29 | 6.21 | 5.55 | 5.47 |

Two of the coated inserts were subjected to metal cutting testing relative to KCP25 inserts of the same geometry commercially available from Kennametal Inc. Parameters of the turning tests were:

Workpiece: 1045 Steel

Speed: 1200 sfm

Feed Rate: 0.013 ipr

Depth of Cut: 0.08 mm

Coolant: flood

The results of the continuous turning testing are provided in Table VIII.

TABLE VIII

Metal Cutting Results

| Sample | Tool Life/Failure Mode | | Mean Tool Life |
|---|---|---|---|
| | REP 1 | REP 2 | |
| Inventive Sample* | 30.7 min/NW | 32.0/NW | 31.3 min |
| KCP25 Comparative | 7.3 min/MW | 10.0. NW NW | 8.7 min |

*Selected from Table VI
NW - nose wear (0.012 in)
MW - max wear (0.012 in)

As provided in Table VIII, the cutting inserts comprising the inventive coating described herein demonstrate significantly longer tool life relative to the comparative KCP25.

Additional metal cutting testing was conducted as follows:
Workpiece: 4340 Steel
Speed: 700 sfm
Feed Rate: 0.012 ipr
Depth of Cut: 0.1 mm
Coolant: flood The results of the continuous turning testing are provided in Table IX.

TABLE VIII

Metal Cutting Results

| Sample | Tool Life/Failure Mode | | Mean Tool Life |
|---|---|---|---|
| | REP 1 | REP 2 | |
| Inventive Sample* | 16.0 min/MW | 10.8 min/MW | 13.4 min |
| KCP25 Comparative | 5.6 min/NW | 3.3 min/MW | 4.5 min |

*Selected from Table VI
NW - nose wear (0.012 in)
MW - max wear (0.012 in)

As provided in Table IX, the cutting inserts comprising the inventive coating described herein demonstrate significantly longer tool life relative to the comparative KCP25.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A coated cutting tool comprising:
a substrate; and
a coating adhered to the substrate, the coating comprising a layer of polycrystalline $\alpha$-$Al_2O_3$ deposited by chemical vapor deposition (CVD), wherein 5% to 15% of all grain boundaries in the polycrystalline $\alpha$-$Al_2O_3$ layer have a misorientation of 2-5 degrees and at least 5% of all grain boundaries in the polycrystalline $\alpha$-$Al_2O_3$ layer have a misorientation of greater than 5 degrees up to 15 degrees as determined using a field-emission scanning electron microscope (FESEM) and an electron backscatter diffraction (EBSD) detector; and wherein the polycrystalline $\alpha$-$Al_2O_3$ layer has a texture coefficient (TC) greater than 6 for the (006) growth direction, the texture coefficient being defined as:

$$TC(hkl) = \frac{I(hkl)}{I_o(hkl)} \left\{ \frac{1}{n} \sum \frac{I(hkl)}{I_o(hkl)} \right\}^{-1}$$

where
I(hkl)=measured intensity of the (hkl) reflection
$I_o$(hkl)=standard intensity of the (hkl) reflection according to International Center for Diffraction Data (ICDD) card 43-1484
n=number of reflections used in the TC calculation
(hkl) reflections used in the TC calculation are (012), (104), (110), (006), (113), (202), (024) and (116).

2. The coated cutting tool of claim 1, wherein at least 6% of all grain boundaries in the polycrystalline $\alpha$-$Al_2O_3$ layer have a misorientation of greater than 5 degrees up to 15 degrees.

3. The coated cutting tool of claim 1, wherein 7-10% of all grain boundaries of polycrystalline $\alpha$-$Al_2O_3$ layer have a misorientation of 2-5 degrees and 6.5-10% of all grain boundaries of polycrystalline $\alpha$-$Al_2O_3$ layer have a misorientation of greater than 5 degrees up to 15 degrees.

4. The coated cutting tool of claim 1, wherein a ratio of grain boundaries in the polycrystalline $\alpha$-$Al_2O_3$ layer having misorientation of 2-5 degrees to grain boundaries having misorientation of greater than 5 degrees up to 15 degrees has a value of 0.7 to 1.8.

5. The coated cutting tool of claim 4, wherein the ratio is 0.9-1.7.

6. The coated cutting tool of claim 4, wherein the ratio is 1.3-1.6.

7. The coated cutting tool of claim 4, wherein the ratio is 1.4-1.7.

8. The coated cutting tool of claim 1, wherein the polycrystalline $\alpha$-$Al_2O_3$ layer has a thickness of 1-20 μm.

9. The coated cutting tool of claim 1, wherein the polycrystalline $\alpha$-$Al_2O_3$ layer has a columnar grain structure.

10. The coated cutting tool of claim 1, wherein the TC (006) is greater than 7.

11. The coated cutting tool of claim 1, wherein the polycrystalline $\alpha$-$Al_2O_3$ layer has a texture coefficient (TC) greater than 5 for the (0 0 12) growth direction, the texture coefficient being defined as:

$$TC(hkl) = \frac{I(hkl)}{I_o(hkl)} \left\{ \frac{1}{n} \sum \frac{I(hkl)}{I_o(hkl)} \right\}^{-1}$$

where
I(hkl)=measured intensity of the (hkl) reflection
$I_o$(hkl)=standard intensity of the (hkl) reflection according to International Center for Diffraction Data (ICDD) card 42-1468
n=number of reflections used in the TC calculation
(hkl) reflections used in the TC calculation are (012), (104), (110), (113), (116), (300) and (0 0 12).

12. The coated cutting tool of claim 11, wherein the TC (0 0 12) is greater than 6.

13. The coated cutting tool of claim 12, where in a ratio of TC (006) to TC (0 0 12) is greater than 1 up to 1.2.

14. The coated cutting tool of claim 1, wherein the coating further comprises one or more inner layers between the layer of polycrystalline $\alpha$-$Al_2O_3$ and the substrate.

15. The coated cutting tool of claim 14, wherein the one or more inner layers comprise one or more metallic elements selected from the group consisting of aluminum and metallic elements of Groups IVB, VB and VIB of the Periodic Table and one or more non-metallic elements selected from the group consisting of non-metallic elements of Groups IIIA, IVA, VA and VIA of the Periodic Table.

16. The coated cutting tool of claim 15, wherein one or more inner layers comprise a TiCN layer.

17. The coated cutting tool of claim 1, wherein the coating further comprises one or more outer layers over the multi-phase refractory layer.

18. The coated cutting tool of claim 1, wherein the substrate comprises cemented carbide comprising metallic binder in an amount of 1-15 weight percent.

19. The coated cutting tool of claim 1, wherein the substrate comprises cemented carbide comprising metallic binder in an amount of 5-12 weight percent.

* * * * *